(12) United States Patent
Chang

(10) Patent No.: US 10,091,090 B2
(45) Date of Patent: Oct. 2, 2018

(54) PACKET FORWARDING IN SOFTWARE DEFINED NETWORKING

(71) Applicant: Hangzhou H3C Technologies Co., Ltd., Hangzhou (CN)

(72) Inventor: Huifeng Chang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 214 days.

(21) Appl. No.: 14/899,462

(22) PCT Filed: Aug. 8, 2014

(86) PCT No.: PCT/CN2014/083953
§ 371 (c)(1),
(2) Date: Dec. 17, 2015

(87) PCT Pub. No.: WO2015/021881
PCT Pub. Date: Feb. 19, 2015

(65) Prior Publication Data
US 2016/0234097 A1      Aug. 11, 2016

(30) Foreign Application Priority Data
Aug. 12, 2013  (CN) .......................... 2013 1 0347955

(51) Int. Cl.
*H04L 12/751* (2013.01)
*H04L 12/64* (2006.01)
(Continued)

(52) U.S. Cl.
CPC .......... *H04L 45/02* (2013.01); *H04L 12/6418* (2013.01); *H04L 45/54* (2013.01); *H04L 45/64* (2013.01); *H04L 49/3063* (2013.01)

(58) Field of Classification Search
CPC . H04L 49/3054; H04L 49/3063; H04L 49/70; H04L 49/3072
See application file for complete search history.

(56) References Cited

U.S. PATENT DOCUMENTS 9,319,336 B2 *  4/2016  Thakkar ................. H04L 47/50
2013/0058354 A1  3/2013  Casado et al.
(Continued)

FOREIGN PATENT DOCUMENTS

| CN | 102957603 | 3/2013 |
|---|---|---|
| CN | 103155489 | 6/2013 |

(Continued)

OTHER PUBLICATIONS

Open Networking Foundation, "Openflow Switch Specification" Version 1.3.2, Apr. 25, 2013.*
(Continued)

*Primary Examiner* — Robert M Morlan
(74) *Attorney, Agent, or Firm* — Mannava & Kang PC

(57) ABSTRACT

Based on an example, two forwarding pipelines are configured in a software defined networking (SDN) switch. After receiving, from an SDN controller, a flow entry adding instruction comprising a flow entry to be added and a table identifier (ID) indicating a flow table that the flow entry is to be added to, an SDN switch adds the flow entry into the flow table corresponding to the table ID, wherein the flow table is in the first forwarding pipeline or the second forwarding pipeline. If the flow table and its next flow table are in different forwarding pipelines, the SDN switch adds an action of forwarding to the internal interface to the flow entry.

13 Claims, 5 Drawing Sheets

(51) Int. Cl.
*H04L 12/715* (2013.01)
*H04L 12/741* (2013.01)
*H04L 12/935* (2013.01)

(56) References Cited

U.S. PATENT DOCUMENTS

| | | |
|---|---|---|
| 2013/0170495 A1 | 7/2013 | Suzuki et al. |
| 2013/0230047 A1 | 9/2013 | Subrahmaniam et al. |
| 2015/0146718 A1* | 5/2015 | Wang ............... H04L 45/38 370/389 |

FOREIGN PATENT DOCUMENTS

| | | |
|---|---|---|
| CN | 103200101 | 7/2013 |
| CN | 103428094 | 12/2013 |
| EP | 2615781 | 7/2013 |
| WO | WO-2012128282 | 9/2012 |

OTHER PUBLICATIONS

International Search Report and Written Opinion dated Nov. 19, 2014, PCT Patent Application No. PCT/CN2014/083953 dated Aug. 8, 2014, State Intellectual Property Office of the P.R. China.

Pan et al., "The FlowAdapter: Enable Flexible Multi-Table Processing on Legacy Hardware", HotSDNar13, Aug. 16, 2013, Hong Kong, China, ACM.

\* cited by examiner

PACKET FORWARDING IN SOFTWARE DEFINED NETWORKING

CLAIM FOR PRIORITY

The present application is a national stage filing under 35 U.S.C 371 of PCT application number PCT/CN2014/083953, having an international filing date Aug. 8, 2014, which claims the benefit of priority from Chinese Patent Application No. 201310347955.X, having a filing date of Aug. 12, 2013, the disclosures of which are hereby incorporated by reference in their entireties.

BACKGROUND

In software defined networking (SDN) network, after receiving a packet, an SDN switch performs a table lookup in a flow table according to various packet header fields. Flow entries match the packet in priority order. If the matching flow entry is found, counters associated with the matching flow entry are updated and an action in the matching flow entry is applied to the packet, e.g., forward the packet via one or more ports, or drop the packet. If no matching flow entry is found, the packet is forwarded to an SDN controller via a secure channel. The above is a packet lookup and forwarding procedure.

The OpenFlow protocol (OFP) is one exemplary SDN protocol which is currently is utilized. For example, an OpenFlow controller creates a flow entry on an OpenFlow switch according to the OpenFlow protocol. The flow entry includes following content:

Match fields: destination IP=5.6.7.8, action: forward to port 1

After receiving a packet with a destination IP address 5.6.7.8, the OpenFlow switch finds the above flow entry. Then the packet is forwarded to port 1 according to the action in the flow entry.

BRIEF DESCRIPTION OF THE DRAWINGS

Features of the present disclosure are illustrated by way of example and not limited in the following figure(s), in which like numerals indicate like elements, in which.

DETAILED DESCRIPTION

Hereinafter, the present disclosure is described in further detail with reference to the accompanying drawings and examples.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Figure 1:
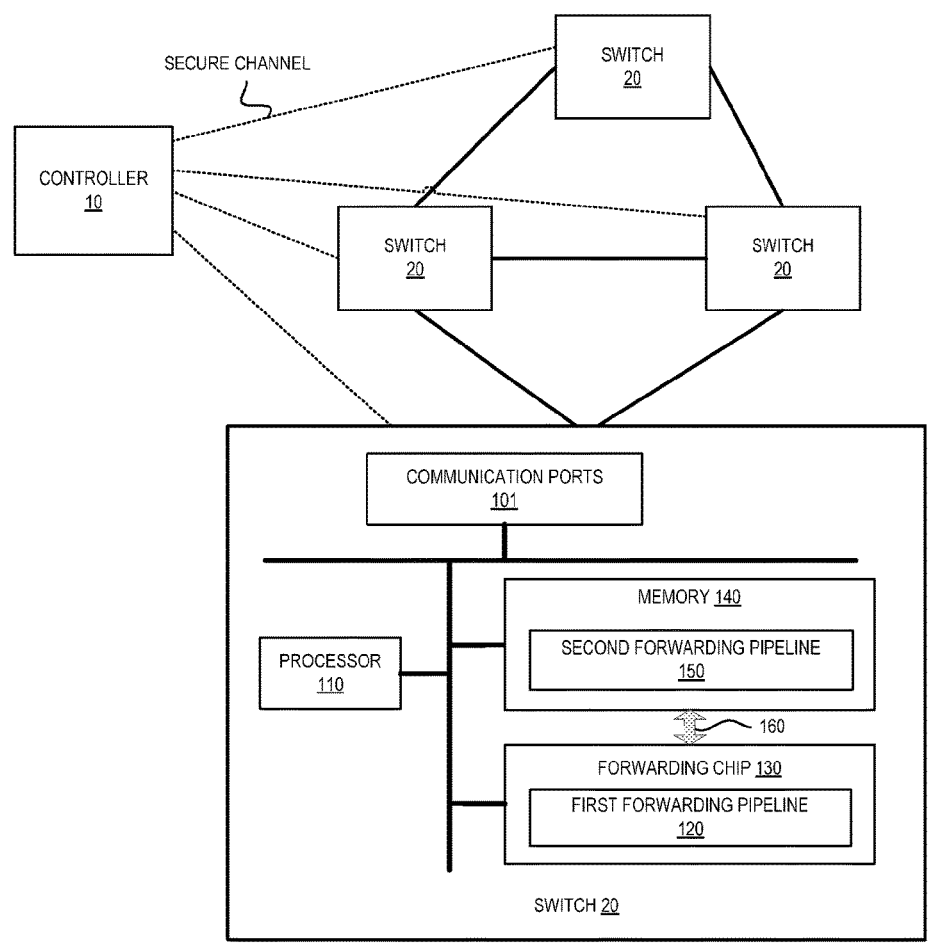
FIG. 1 shows an SDN network in one or more examples of the present disclosure.

FIG. 1 is a schematic diagram illustrating an SDN network according to an example of the present disclosure. As shown in FIG. 1, the SDN network in the example of the present disclosure includes: an SDN controller 10 and SDN switches 20. The SDN controller 10 and the SDN switches 20 operate according to an SDN protocol, such as an OpenFlow protocol. If the SDN switches 20 operate according to the OpenFlow protocol, the SDN switches 20 may be called OpenFlow switches. The SDN controller 10 and the SDN switches 20 communicate via secure channels provided by the SDN protocol.

The SDN switch 20 includes a processor 110, a forwarding chip 120, a memory 140, and communication port 101, wherein the forwarding chip 120 includes a first forwarding pipeline 130 and the memory 140 includes a second forwarding pipeline 150. Packets are forwarded between the first forwarding pipeline 130 and the second forwarding pipeline 150 through an internal interface 160. The internal interface 160 may be a connector or peripheral component interconnect (PCI) bus connecting the forwarding chip 120 and the memory 140. The communication port 101 may include a plurality of communication ports which may be Ethernet ports, optical ports, etc.

In one example, the forwarding chip 120 is a hardware forwarding chip such as an application specific integrated circuit (ASIC), wherein the hardware forwarding chip handles packet lookup and forwarding operations based on one or more flow tables in the first forwarding pipeline 130.

The memory 140 stores machine readable instructions executable by the processor 110 to handle packet lookup and forwarding operations based on one or more flow tables in the second forwarding pipeline 150.

The one or more flow tables of the first forwarding pipeline 130 are connected with the one or more flow tables of the second forwarding pipeline 150 in series to form multiple flow tables.

The one or more flow tables of the first forwarding pipeline 130 and the one or more flow tables of the second forwarding pipeline 150 may be stored in a ternary content addressable memory (TCAM), other content addressable memory, or other kinds of memory such as flash memory, RAM, EEPROM, etc.

The SDN switch 20 creates a flow table in the first forwarding pipeline 130 or the second forwarding pipeline 150 and populates the flow table by adding a flow entry on basis of an instruction from the SDN controller 10. The SDN switch 20 may also add a flow entry in a flow table in the first forwarding pipeline 130 or the second forwarding pipeline 150 on basis of an instruction from the SDN controller 10.

In this example, a second forwarding pipeline is added in the SDN switch. Some of the multiple flow tables in the SDN switch are realized via the forwarding chip and the others are realized via machine readable instructions in the memory and entry resources in the second forwarding pipeline. Thus, functions that the forwarding chip does not support can be realized by the machine readable instructions in the memory and the second forwarding pipeline. Thus, complicated flow table forwarding functions may be supported.

Figure 2:
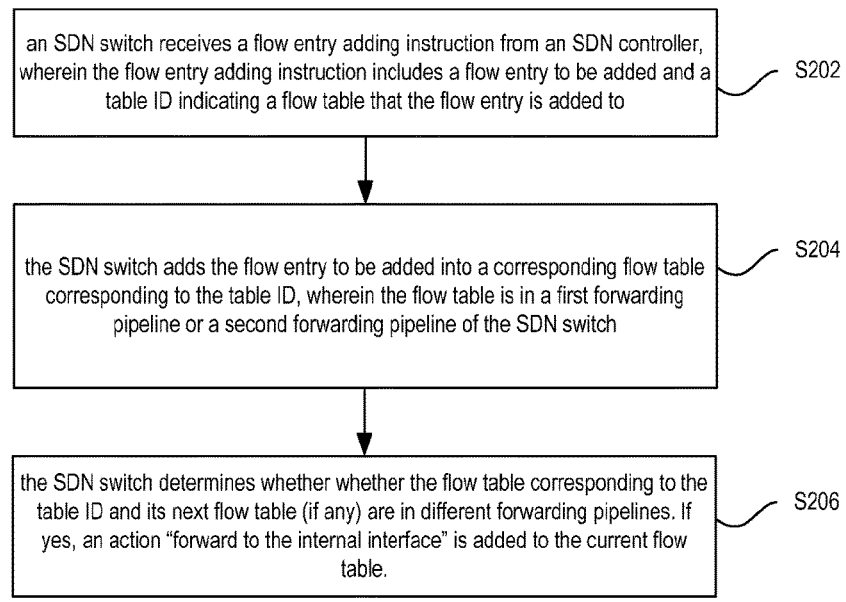
FIG. 2 shows a flow entry adding procedure in one or more examples of the present disclosure.

FIG. 2 is a flowchart illustrating a flow entry adding procedure in an SDN network according to an example of the present disclosure. As shown in FIG. 2, the method includes the following.

At block S202, an SDN switch receives a flow entry adding instruction from an SDN controller, wherein the flow entry adding instruction includes a flow entry to be added and a table ID indicating a flow table that the flow entry is added to.

At block S204, the SDN switch adds the flow entry to be added into a flow table corresponding to the table ID, wherein the flow table is in a first forwarding pipeline or a second forwarding pipeline of the SDN switch.

As described above, the first forwarding pipeline is in a hardware forwarding chip such as an application specific integrated circuit (ASIC) and includes one or more flow tables, wherein the hardware forwarding chip handles packet lookup and forwarding operations based on the one or more flow tables in the first forwarding pipeline.

The second forwarding pipeline is in a memory and includes one or more flow tables, wherein the memory stores machine readable instructions executable by a processor to handle packet lookup and forwarding operations based on the one or more flow tables in the second forwarding pipeline.

The one or more flow tables of the first forwarding pipeline are connected with the one or more flow tables of the second forwarding pipeline in series to form multiple flow tables.

The SDN controller and the SDN switch may negotiate in advance whether a flow table indicated by a table ID is created in the first forwarding pipeline or the second forwarding pipeline and order of the flow tables.

Figure 3:
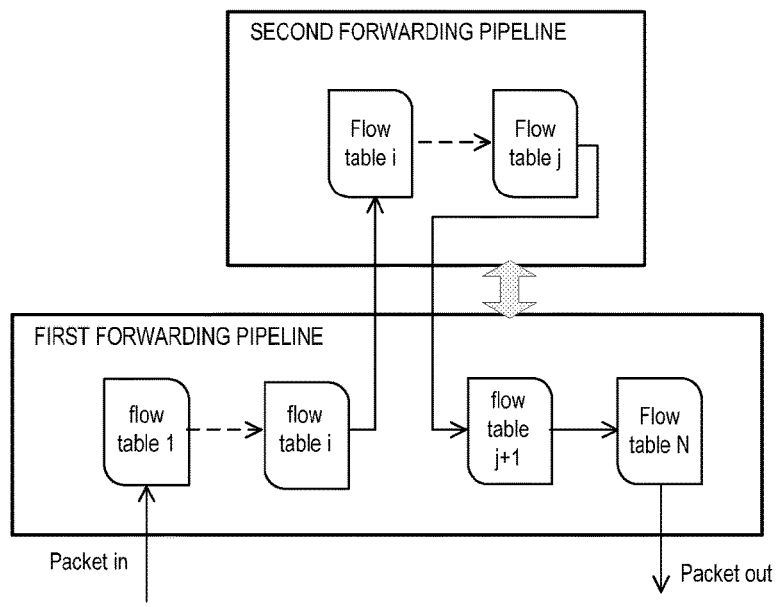
FIG. 3 shows multiple flow tables in the SDN switch in one or more examples of the present disclosure.

In an example, the locations of the flow tables are not restricted and the order of the flow tables is also not restricted. However, in order to avoid repeatedly forwarding between the first forwarding pipeline and the second forwarding pipeline, flow tables with continuous table IDs may be created in the second forwarding pipeline. For example, as shown in FIG. 3, flow tables 1~i and j+1~N are in the first forwarding pipeline 301. Flow tables i+1~j are in the second forwarding pipeline 302. Thus, packets are forwarded between the first forwarding pipeline 301 and the second forwarding pipeline 302 for 2 times. After receiving a packet, the SDN switch performs packet lookup and forwarding operations based on flow tables 1 to N.

Figure 5:
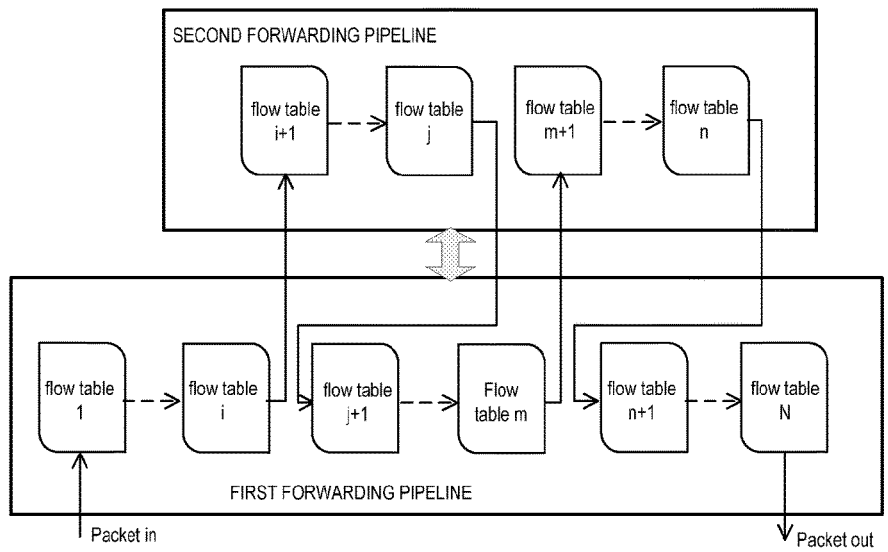
FIG. 5 shows multiple flow tables in the SDN switch in one or more examples of the present disclosure.

In FIG. 3, all flow tables in the second forwarding pipeline are connected continuously in series. In an example, the flow tables in the second forwarding pipeline may also be discontinuous, as shown in FIG. 5. Thus, the packet is forwarded between the first forwarding pipeline and the second forwarding pipeline more than three times. This manner may be used in some networking scenarios.

In block S204, the flow table corresponding to the table ID in the flow entry adding instruction may be a flow table existing in the first forwarding pipeline or the second forwarding pipeline, or a flow table not be created yet. In one example, the SDN switch may finish the creation of the flow table before receiving the flow entry adding instruction. The SDN switch may also start to create the flow table after receiving the flow entry adding instruction.

In the case that the flow table is created before the flow entry adding instruction is received, in block S204, the flow entry in the flow entry adding instruction is added to the flow table indicated by the table ID.

In the case that the flow table is created after the flow entry adding instruction is received, in block S204, the SDN switch creates the flow table corresponding to the table ID in the first forwarding pipeline or the second forwarding pipeline.

In one example, according to a negotiation between the SDN switch and the SDN controller, the SDN controller determines whether the flow table indicated by the table ID in the flow entry adding instruction is created in the first forwarding pipeline or the second forwarding pipeline. In addition, the order of flow tables may also be determined in advance. For example, flow tables may be arranged according to an ascending order of their table IDs.

Thus, according to the negotiation, the SDN switch may determine whether the flow table corresponding to the table ID should be created in the first forwarding pipeline or the second forwarding pipeline. If it is the first forwarding pipeline, the SDN switch creates the flow table in the first forwarding pipeline and adds the flow entry to the flow table in the first forwarding pipeline. If it is the second forwarding pipeline, the SDN switch creates the flow table in the second forwarding pipeline and adds the flow entry to the flow table in the second forwarding pipeline.

At block S206, the SDN switch determines whether the flow table corresponding to the table ID and its next flow table (if any) are in different forwarding pipelines. If yes, an action "forward to the internal interface" is added to the current flow table.

For example, suppose that flow table i (i is an integer) is the current flow table and is in the first forwarding pipeline. Flow table i+1 is the next flow table of the current flow table and flow table i+1 is in the second forwarding pipeline. In block S206, when the flow entry is added in flow table i, an action is added in the action of the flow entry. The action is forward to the internal interface, i.e., the SDN switch automatically adds an action "forward to internal interface" when adding the flow entry in flow table i, such that the packet may be forwarded to the second forwarding pipeline.

Similarly, if the current flow table j (j is an integer) in the second forwarding pipeline is connected in series with a flow table j+1 in the first forwarding pipeline, in block S206, when the flow entry is added in the current flow table j, an action is added in the flow entry, i.e., when the SDN switch adds the flow entry in the current flow table j of the second forwarding pipeline, the SDN switch automatically adds "forward to the internal interface" in the action, such that the packet may be forwarded back to the first forwarding pipeline.

In one example, if the current flow table is the last flow table in the SDN switch, block S206 is omitted.

Through the above blocks S202~S206, a flow entry is added to the first forwarding pipeline or the second forwarding pipeline of the SDN switch. In addition, if the current flow table and its next flow table are in different forwarding pipelines, an action of forward to internal interface is added in the flow entry. Thus, packets may be forwarded between the first forwarding pipeline and the second forwarding pipeline.

Figure 4:
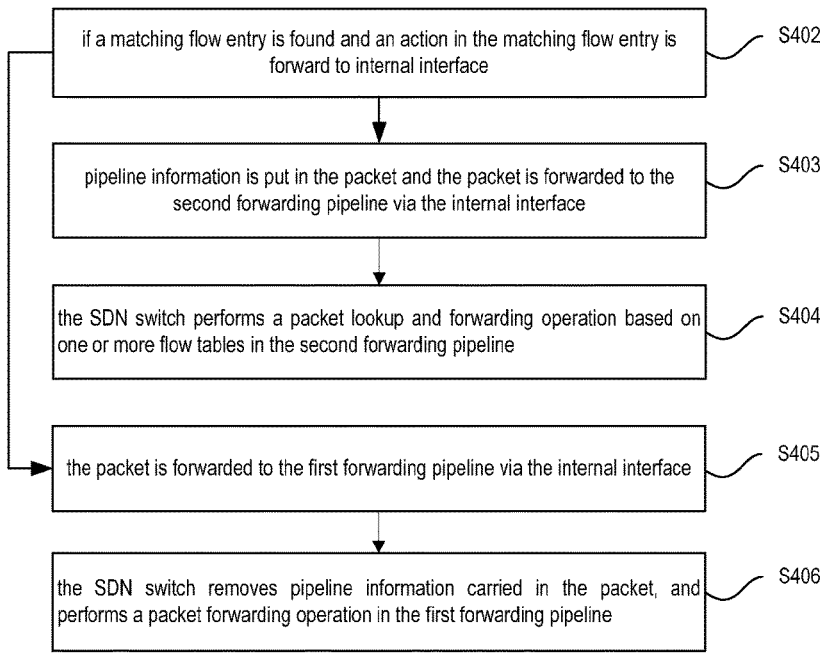
FIG. 4 shows a packet forwarding method in the SDN network in one or more examples of the present disclosure.

FIG. 4 is a flowchart illustrating a packet forwarding method in an SDN network according to an example of the present disclosure.

At block S401, the SDN switch performs a table lookup in a flow table according to various packet header fields of a packet, wherein the flow table is in the first forwarding pipeline or the second forwarding pipeline of the SDN switch.

In this block, the packet is matched against flow entries in the flow table according to various packet header fields. Packet match fields are extracted from the packet for table lookup. The packet matches a flow entry if values of the packet match fields match those defined in the flow entry.

At block S402, if a matching flow entry is found and an action in the matching flow entry is forward to internal interface, the SDN switch adds pipeline information to the packet and forwards the packet containing the pipeline information to the second forwarding pipeline at block S403, or forwards a packet containing pipeline information to the first forwarding pipeline at block S405.

If a matching flow entry is found, counters associated with the matching flow entry are updated and an action in the matching flow entry is applied to the packet. In this block, if an action in the matching flow entry is "forward to internal interface", it indicates that the current flow table and its next flow table are in different forwarding pipelines. For example, if the current flow table (e.g., flow table i in FIG. 3) is in the first forwarding pipeline, the next flow table (e.g., flow table i+1 in FIG. 3) is in the second forwarding pipeline.

In order to avoid changes to the first forwarding pipeline, before being forwarded to the second forwarding pipeline, the packet is added with pipeline information, wherein the pipeline information includes an ingress port of the packet via which the packet enters the SDN switch, a packet processing status indicating a flow table at which the packet lookup and forwarding operation is performed, and an egress port (if any). After the packet is forwarded back to the first forwarding pipeline, the pipeline information is removed from the packet.

At block S403, pipeline information is put in the packet and the packet is forwarded to the second forwarding pipeline via the internal interface.

As described above, before being forwarded to the second forwarding pipeline, the packet is added with pipeline information, wherein the pipeline information includes an ingress port of the packet via which the packet enters the SDN switch, a packet processing status indicating a flow table at which the packet lookup and forwarding operation is performed, and an egress port (if any).

For example, if the packet processing status is the flow table i, it indicates that a packet lookup and forwarding is performed based on the flow table i. In an example, if an egress port other than the internal interface has been obtained before table lookup is performed in the flow table i, the pipeline information to be carried includes the egress port of the packet. Otherwise, the pipeline information does not carry the egress port.

In an example, the pipeline information may be carried by adding additional label information outside of the packet, i.e., a physical layer packet transmitted by the internal interface contains both the packet and the label information carrying the pipeline information.

At block S404, the SDN switch performs a packet lookup and forwarding operation based on one or more flow tables in the second forwarding pipeline.

During the packet lookup and forwarding operation, the pipeline information in the packet may be modified according to an action in a matching flow entry. In other words, when performing the packet lookup and forwarding operation, the second forwarding pipeline may modify the packet and the label information according to a lookup result but does not modify the packet processing status.

After the packet lookup and forwarding operation in block S404, if a flow table (e.g., flow table j in FIG. 3) in the second forwarding pipeline redirects the packet to a flow table (e.g., flow table j+1 in FIG. 3) in the first forwarding pipeline, the packet may be forwarded back to the first forwarding pipeline.

Thereafter, a packet lookup and forwarding operation may be performed based on subsequent flow tables (e.g., flow tables j+1~N in FIG. 3) in the first forwarding pipeline.

Figure 7:
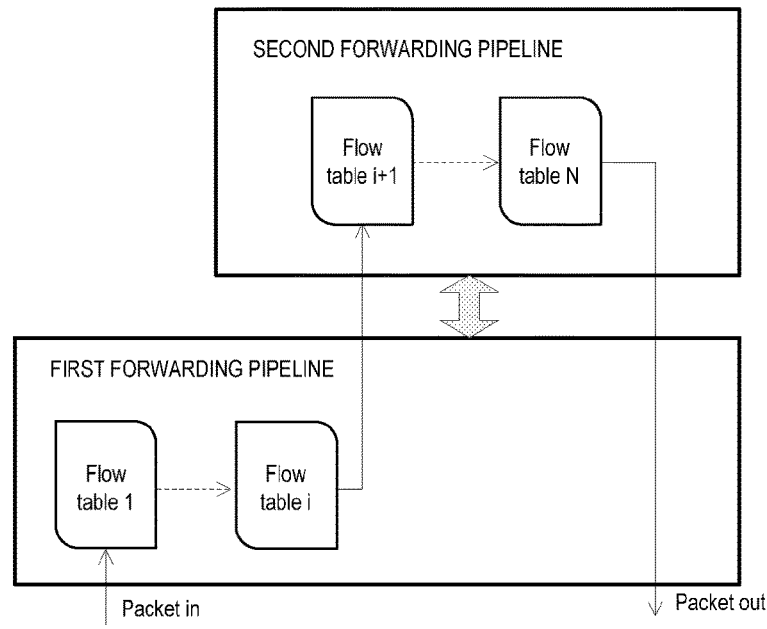
FIG. 7 shows multiple flow tables in the SDN switch in one or more examples of the present disclosure.

If the last flow table of the SDN switch is in the second forwarding pipeline, see FIG. 7 for an example, the packet may be forwarded back to the first forwarding pipeline and then transmitted out via an egress port of the SDN switch. At this time, it should be noted that, after the packet is transmitted to the first forwarding pipeline and before being transmitted out via the egress port, the pipeline information in the packet should be removed.

At block S405, the packet is forwarded to the first forwarding pipeline via the internal interface.

In this block, the packet is forwarded from the second forwarding pipeline back to the first forwarding pipeline. Since the packet firstly enters first forwarding pipeline, packet has been added with pipeline information before arriving at the second forwarding pipeline.

For example, as shown in FIG. 3, when the packet is redirected from flow table i in the first forwarding pipeline to flow table i+1 in the second forwarding pipeline, pipeline information is added to the packet.

Figure 6:
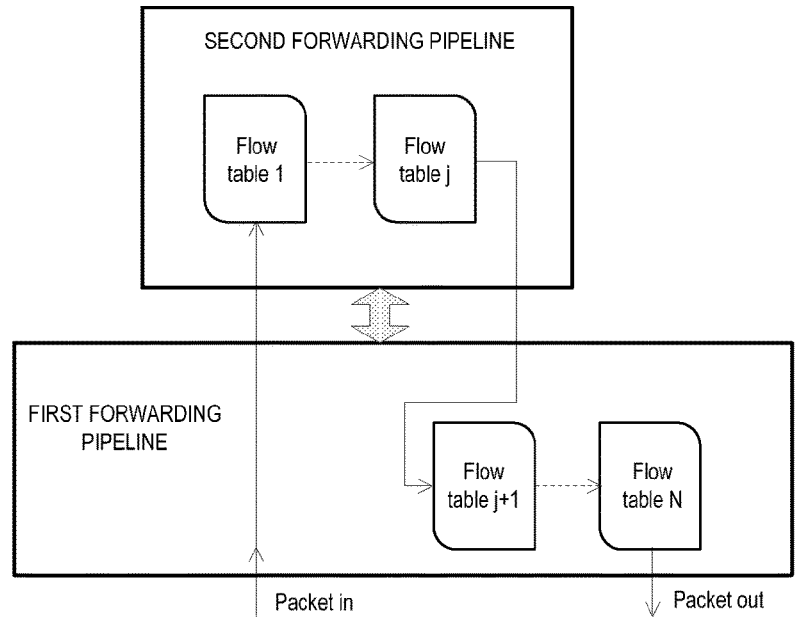
FIG. 6 shows multiple flow tables in the SDN switch in one or more examples of the present disclosure.

If the first flow table of the SDN switch is in the second forwarding pipeline, as show in FIG. 6, after the packet enters the first forwarding pipeline, pipeline information is added to the packet and then the packet is forwarded to the second forwarding pipeline. At this time, the packet processing status in the pipeline information is null.

During the packet lookup and forwarding operation in the second forwarding pipeline, the pipeline information may be modified. In this block, the packet carrying the pipeline information is forwarded back to the first forwarding pipeline.

At block S406, the SDN switch removes pipeline information carried in the packet, and performs a packet forwarding operation in the first forwarding pipeline.

After receiving the packet carrying the pipeline information via the internal interface, the first forwarding pipeline removes the pipeline information of the packet. If there are still flow tables (e.g., flow tables j+1~N in FIG. 3) in the first forwarding pipeline the SDN switch performs a packet lookup and forwarding operation based on the flow table j+1 and following flow tables in the first forwarding pipeline.

If there is no more flow table in the first forwarding pipeline (i.e., the last flow table is in the second forwarding pipeline, see FIG. 7 for an example), the SDN switch removes the pipeline information of the packet and transmits the packet out via an egress port.

According to the example of the present disclosure, a second forwarding pipeline is added in the SDN switch. Some of the multiple flow tables in the SDN switch are realized via the hardware forwarding chip and entry resources in the first forwarding pipeline and the others are realized via machine readable instructions in the memory and entry resources in the second forwarding pipeline. Thus, functions that the forwarding chip and the first forwarding pipeline do not support can be realized by the machine readable instructions in the memory and the second forwarding pipeline. Thus, complicated flow table forwarding functions may be supported.

In accordance with the above examples, an example of the present disclosure provides a packet forwarding apparatus in the SDN network. For example, the apparatus may be an OpenFlow switch.

Figure 8:
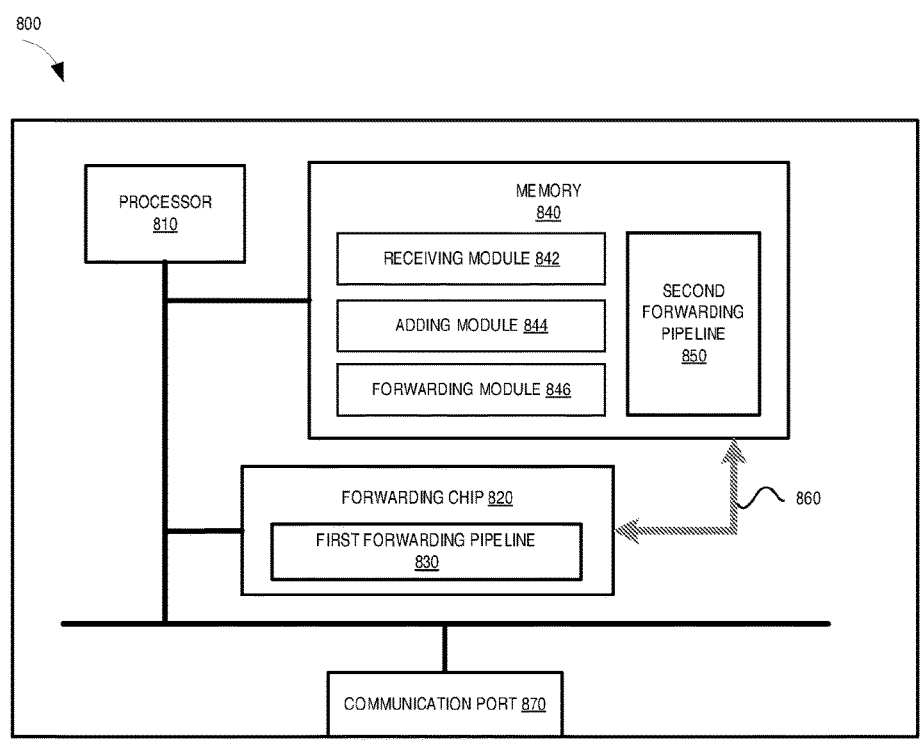
FIG. 8 shows a structure of an SDN switch in one or more examples of the present disclosure.

As shown in FIG. 8, the apparatus 800 includes a processor 810, a forwarding chip 820, a memory 840, and communication port 870; the forwarding chip 820 includes a first forwarding pipeline 830 and the memory 840 includes a second forwarding pipeline 850; wherein packets are forwarded between the first forwarding pipeline 830 and the second forwarding pipeline 850 via an internal interface 860.

In one example, the forwarding chip 820 is a hardware forwarding chip such as an application specific integrated circuit (ASIC), wherein the hardware forwarding chip handles packet lookup and forwarding operations based on one or more flow tables in the first forwarding pipeline 830.

The memory 840 stores machine readable instructions executable by the processor 810 to handle packet lookup and forwarding operations based on one or more flow tables in the second forwarding pipeline 850.

The one or more flow tables of the first forwarding pipeline 830 are connected with the one or more flow tables of the second forwarding pipeline 850 in series to form multiple flow tables.

The one or more flow tables of the first forwarding pipeline 830 and the one or more flow tables of the second forwarding pipeline 850 may be stored in a ternary content addressable memory (TCAM), other content addressable memory, or other kinds of memory such as flash memory, RAM, EEPROM, etc.

The memory 840 stores program modules executable by the processor 810. The program modules include the following.

A receiving module 842 receives a flow entry adding instruction from an SDN controller, wherein the flow entry adding instruction includes a flow entry to be added and a table ID indicating a flow table that the flow entry is added to.

A flow entry adding module 844 (i) adds the flow entry in the flow entry adding instruction received by the receiving module 842 into a flow table corresponding to the table ID, wherein the flow table is in the first forwarding pipeline 830 or the second forwarding pipeline 850; (ii) determines whether the flow table corresponding to the table ID and its next flow table (if any) is in different forwarding pipelines; (iii) if yes, adds an action "forward to the internal interface" to the flow table corresponding to the table ID.

If the first flow table of the apparatus 800 in is the first forwarding pipeline, after receiving a packet from an ingress port of the apparatus 800, the forwarding chip 820 performs a table lookup in a flow table in the first forwarding pipeline 830. If a matching flow entry is found and an action in the matching flow entry is forward to the internal interface 860, the forwarding chip 820 forwards the packet to the second forwarding pipeline via the internal interface 860.

If the first flow table of the apparatus 800 is in the second forwarding pipeline, after receiving a packet from an ingress port of the apparatus 800, the forwarding chip 820 adds pipeline information to the packet and forwards the packet to the second forwarding pipeline.

After receiving a packet containing pipeline information from the second forwarding pipeline 850, the forwarding chip 820 removes the pipeline information from the packet.

If the last flow table is in the second forwarding pipeline 850, the forwarding chip 820 transmits the packet via an egress port of the apparatus 800 after removing the pipeline information.

If the last flow table is in the first forwarding pipeline 830, the forwarding chip 820 performs a packet lookup and forwarding operation based on the one or more flow tables in the first forwarding pipeline after removing the pipeline information, and transmits the packet via an egress port of the apparatus 800.

The memory 840 further includes:

a forwarding module 846, to (i) receive the packet containing the pipeline information from the first forwarding pipeline, and perform a packet lookup and forwarding operation based on the one or more flow tables in the second forwarding pipeline; or (ii) transmit the packet containing the pipeline information to the first forwarding pipeline via the internal interface 860.

According to the example of the present disclosure, a second forwarding pipeline is added in the SDN switch. Some of the multiple flow tables in the SDN switch are realized via the hardware forwarding chip and entry resources in the first forwarding pipeline and the others are realized via machine readable instructions in the memory and entry resources in the second forwarding pipeline. Thus, functions that the forwarding chip and the first forwarding pipeline do not support can be realized by the machine readable instructions in the memory and the second forwarding pipeline. Thus, complicated flow table forwarding functions may be supported.

All of the features disclosed in this specification (including any accompanying claims, abstract and drawings), and/or all of the steps of any method or process so disclosed, may be combined in any combination, except combinations where at least some of such features and/or steps are mutually exclusive.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

What is claimed is:

1. A method for forwarding a packet by a software defined networking (SDN) switch, comprising:

receiving, from an SDN controller, a flow entry adding instruction comprising a flow entry to be added and a table identifier (ID) indicating a flow table to which the flow entry is to be added in the SDN switch, the SDN switch having a forwarding chip and a memory, the forwarding chip including a first forwarding pipeline and the memory including a second forwarding pipeline, the SDN switch also having an internal interface between the first forwarding pipeline and the second forwarding pipeline;

adding, by a processor of the SDN switch, the received flow entry into the flow table corresponding to the table ID, wherein the flow table is in the first forwarding pipeline or the second forwarding pipeline, wherein one or more flow tables in the first forwarding pipeline and one or more flow tables in the second forwarding pipeline are connected in series via the internal interface;

in response to the flow table and a next flow table of the flow table in the series being in different ones of the first forwarding pipeline and the second forwarding pipeline, adding, by the processor, an action of forwarding to the internal interface to the flow entry;
receiving a packet in the SDN switch; and
processing the packet through the one or more flow tables in either or both of the first forwarding pipeline and the second forwarding pipeline.

2. The method of claim 1, further comprising:
receiving the packet via an ingress port of the SDN switch;
performing a table lookup for a matching flow entry for the packet;
in response to the matching flow entry being found in a flow table and the matching flow entry indicating that the packet is to be forwarded to the internal interface,
in response to the flow table in which the matching flow entry was found being in the first forwarding pipeline, adding pipeline information to the packet and forwarding the packet containing the pipeline information to the second forwarding pipeline, and
in response to the flow table in which the matching flow entry was found being in the second forwarding pipeline, forwarding the packet to the first forwarding pipeline;
wherein the pipeline information comprises the ingress port of the SDN switch via which the packet was received, and a packet processing status indicating a flow table at which a packet lookup and forwarding operation is performed.

3. The method of claim 2, wherein the pipeline information further comprises an egress port via which the packet is to be forwarded from the SDN switch.

4. The method of claim 2, further comprising:
after forwarding the packet to the second forwarding pipeline, performing a packet lookup and forwarding operation based on the one or more flow tables in the second forwarding pipeline.

5. The method of claim 2, wherein the packet is forwarded to the first forwarding pipeline and comprises the pipeline information in response to the flow table in which the matching flow entry was found being in the second forwarding pipeline, the method further comprising:
after forwarding the packet comprising the pipeline information, removing the pipeline information from the packet.

6. The method of claim 1, further comprising:
receiving a packet via an ingress port of the SDN switch; and
adding pipeline information to the packet, and forwarding the packet containing the pipeline information to the second forwarding pipeline,
wherein the pipeline information comprises the ingress port of the SDN switch through which the packet was received, and a packet processing status indicating a flow table at which a packet lookup and forwarding operation is performed.

7. An apparatus for forwarding a packet, comprising:
a processor, a forwarding chip, a memory, an internal interface, and a communication port;
the forwarding chip comprising a first forwarding pipeline and being to handle packet lookup and forwarding operations based on one or more flow tables in the first forwarding pipeline;
the memory comprising a second forwarding pipeline and storing machine readable instructions executable by the processor to handle packet lookup and forwarding operations based on one or more flow tables in the second forwarding pipeline;
the one or more flow tables of the first forwarding pipeline being connected with the one or more flow tables of the second forwarding pipeline in series via the internal interface to form multiple flow tables;
the memory further storing instructions executable by the processor to:
receive a flow entry adding instruction, wherein the flow entry adding instruction includes a flow entry to be added and a table identifier (ID) indicating a flow table to which the flow entry is to be added;
add the flow entry in the received flow entry adding instruction into a flow table corresponding to the table ID, wherein the flow table is in the first forwarding pipeline or the second forwarding pipeline;
determine whether the flow table corresponding to the table ID and a next flow table of the flow table in the series are in different ones of the first and the second forwarding pipelines;
in response to a determination that the flow table and the next flow table are in different ones of the first and the second forwarding pipelines, add an action to forward packets to the internal interface to the flow table corresponding to the table ID,
wherein the apparatus is to receive a packet and either or both of the first forwarding pipeline and the second forwarding pipeline is to process the packet.

8. The apparatus of claim 7, wherein, in response to receipt of the packet from an ingress port of the apparatus, the forwarding chip is further to:
perform a table lookup in a flow table in the first forwarding pipeline for a matching flow entry of the packet; and
in response to the matching flow entry being found in the flow table in the first forwarding pipeline and the matching flow entry indicating that the packet is to be forwarded to the internal interface, forward the packet to the second forwarding pipeline via the internal interface.

9. The apparatus of claim 7, wherein, in response to receipt of the packet from an ingress port of the apparatus, the forwarding chip is further to:
add pipeline information to the packet; and
forward the packet to the second forwarding pipeline;
wherein the pipeline information comprises the ingress port of the apparatus through which the packet was received, and a packet processing status indicating a flow table at which a packet lookup and forwarding operation is performed.

10. The apparatus of claim 7, wherein the forwarding chip is further to:
in response to receipt of a packet containing pipeline information from the second forwarding pipeline, remove the pipeline information from the packet;
wherein the pipeline information comprises an ingress port of the apparatus through which the packet was received, and a packet processing status indicating a flow table at which a packet lookup and forwarding operation is performed.

11. The apparatus of claim 10, wherein, in response to a last flow table of multiple flow tables through which the packet is to be communicated is in the second forwarding pipeline, the forwarding chip is further to transmit the packet via an egress port of the apparatus after the pipeline information is removed.

12. The apparatus of claim 10, wherein, in response to a last flow table of multiple flow tables through which the packet is to be communicated is in the first forwarding pipeline, the forwarding chip is further to:
- perform a packet lookup and forwarding operation based on the one or more flow tables in the first forwarding pipeline after the pipeline information is removed, and
- transmit the packet via an egress port of the apparatus.

13. The apparatus of claim 7, wherein the memory further stores instructions executable by the processor to:
- receive a packet containing pipeline information from the first forwarding pipeline, and perform a packet lookup and forwarding operation based on the one or more flow tables in the second forwarding pipeline; or
- transmit a packet containing pipeline information to the first forwarding pipeline via the internal interface;
- wherein the pipeline information comprises an ingress port of the apparatus through which the packet was received, and a packet processing status indicating a flow table at which a packet lookup and forwarding operation is performed.

\* \* \* \* \*